May 20, 1958

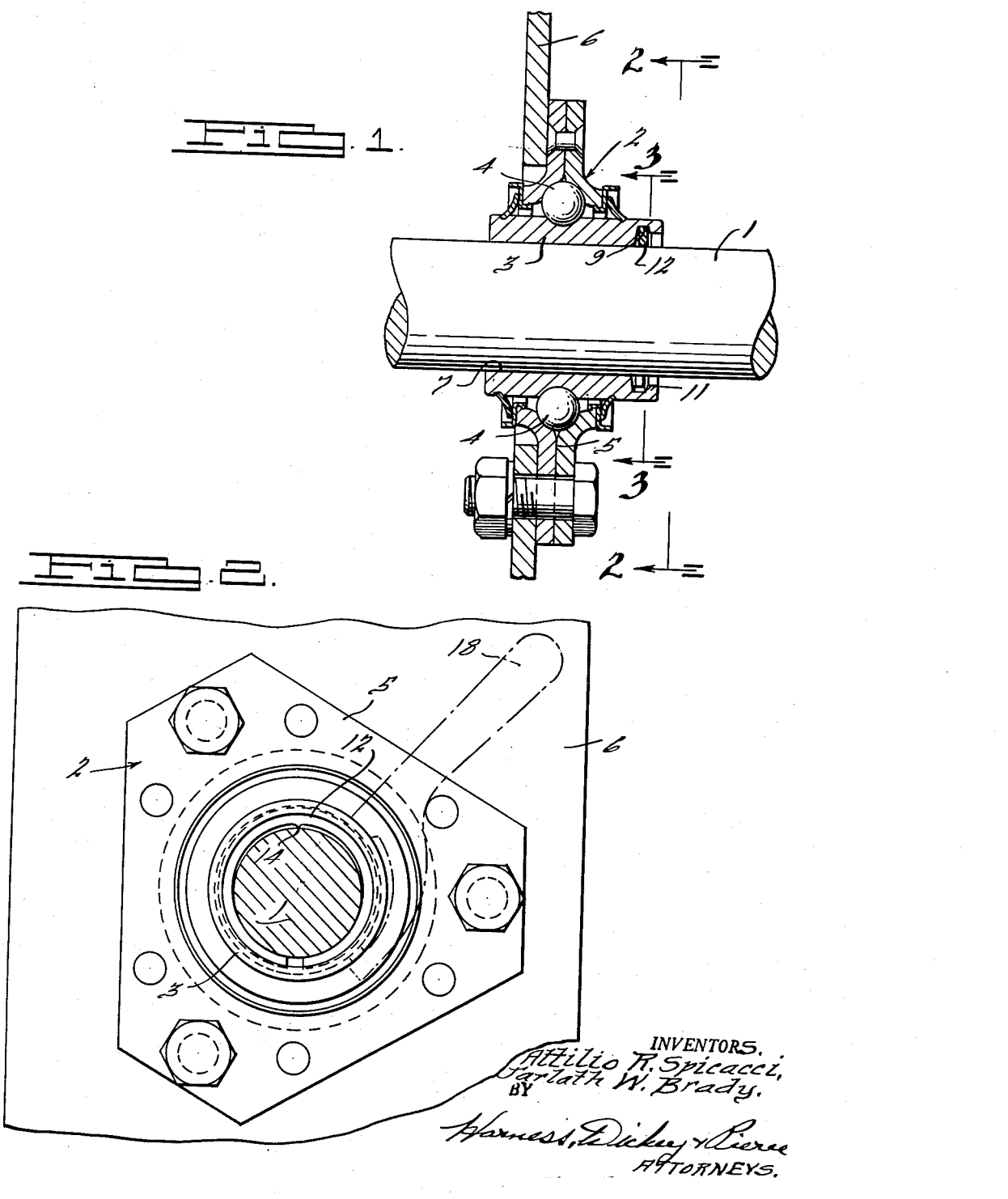

A. R. SPICACCI ET AL 2,835,519

BEARING LOCKING DEVICE

Filed July 7, 1954

INVENTORS.
Attilio R. Spicacci,
Farlath W. Brady,
BY
Harness, Dickey & Pierce
ATTORNEYS.

United States Patent Office 2,835,519
Patented May 20, 1958

2,835,519

BEARING LOCKING DEVICE

Attilio R. Spicacci and Jarlath W. Brady, Lancaster, Pa., assignors to Federal-Mogul Corporation, Ann Arbor, Mich., a corporation of Michigan Application July 7, 1954, Serial No. 441,706

2 Claims. (Cl. 287—52.09)

The present invention relates to a locking means for securing a sleeve-like member to a straight shaft, and particularly relates to an improved locking means for securing a ball or roller bearing assembly at a predetermined location on a straight shaft.

The present invention is illustrated in connection with a bearing assembly and has particular utility in this relation, but in its broader aspects is directed to a construction for securing a sleeve or ring-like member to a straight shaft. In many installations it is desirable to position a bearing assembly at a particular or predetermined location intermediate the ends of a straight shaft and to then lock such assembly in such position.

It is one of the primary objects of the present invention to provide a reliable and positive locking means in devices of the type mentioned in which such device may be quickly moved to its proper position on the shaft, or the shaft moved to its proper position relative to the device, and when in such position quickly and positively locked in place.

A further object of the present invention is to provide an improvement in devices of the type mentioned in which the device is locked to the shaft by a simple rotative movement and in which such locking may take place by rotation in either direction.

A further object of the invention is to provide an improved locking mechanism of the type mentioned which may be easily released so that the device may be either removed from the shaft or moved to a different location thereon.

Other objects of the invention will become apparent from the following specification, the drawings relating thereto, and from the claims hereinafter set forth.

In the drawings in which like numerals are used to designate like parts in the several views throughout:

Figure 1 is a vertical cross-sectional view through a bearing assembly in which the present invention is illustrated, and showing such assembly mounting a straight shaft;

Fig. 2 is an end elevational and cross-sectional view taken substantially along the line 2—2 of Fig. 1;

Figure 3:
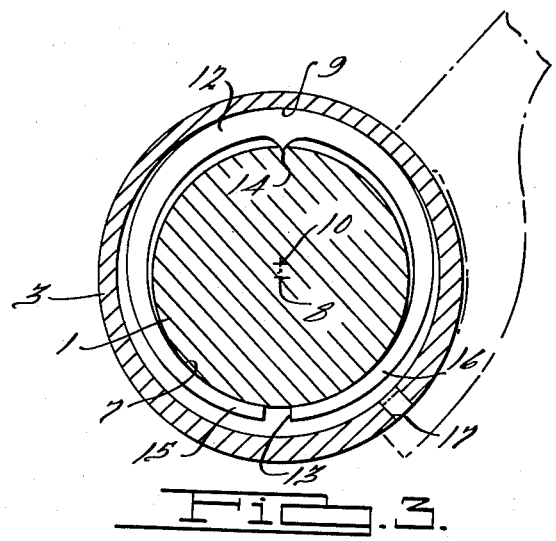
Fig. 3 is an enlarged cross-sectional view taken substantially along the line 3—3 of Fig. 1 and illustrating the locking means of the present invention in its locked position.

Referring to the drawings, a straight shaft is illustrated at 1, which may rotate or be driven in either direction. A bearing assembly, generally indicated at 2, is mounted upon the shaft 1. As mentioned above, the present invention is illustrated in connection with a bearing assembly, but it is to be appreciated that the particular bearing assembly here shown is merely by way of illustration, and that the invention here disclosed and claimed is adapted for use with other types of bearings and in other installations where the locking of a sleeve-like member to a straight shaft has utility.

The bearing assembly here illustrated comprises an inner sleeve-like member 3 which forms an inner bearing ring having balls 4 disposed in an annular race or groove therein in the usual way. An outer annular bearing race 5 is mounted for relative rotation with respect to the inner member 3 in engagement with the balls 4, and such outer member 5 may be suitably secured to a frame member 6, or the like. Thus, in the assembly here illustrated, the bearing assembly 2 serves to mount or support one end of the shaft 1 therein.

The inner sleeve 3 has a concentric bore or opening 7 therethrough which is adapted to engage and embrace the shaft 1. The center of such concentric opening 7 is indicated at 8 in Figs. 3 and 4. An annular eccentric groove 9, having a center 10 (Figs. 3 and 4), is formed inwardly of one end of the sleeve 3, and such end terminates in an inwardly directed flange 11. The opening defined by the flange 11 may be concentric with the opening 7 so that only a portion, approximately half, serves as a retaining wall for the wedging member that is disposed within the eccentric groove 9. This serves as a retention for the wedge member, as will be more apparent from the following description.

A resilient retaining member 12 is disposed within the eccentric groove 9 and, as shown in Figs. 3–6, is in the form of a split ring, the opening for the split ring being indicated at 12. The split ring 13 may be termed an eccentric member, and is of gradually increasing thickness from the edges of the opening 13 around the ring to a diametrically opposed point, so that the opposite sides of the ring define a pair of integral and adjacent wedge members.

At the point of greatest thickness of the member 12, an inwardly-directed sharp point or edge 14 is formed integral with the member 12.

The outer periphery of the member 12 may be circular and is received within the eccentric groove 9 in its initial position, so that the thickest portion of the wedge member 12, that is, that portion at the point 14, is disposed adjacent the thinnest wall portion of the sleeve 3 within the groove 9.

Figure 4:
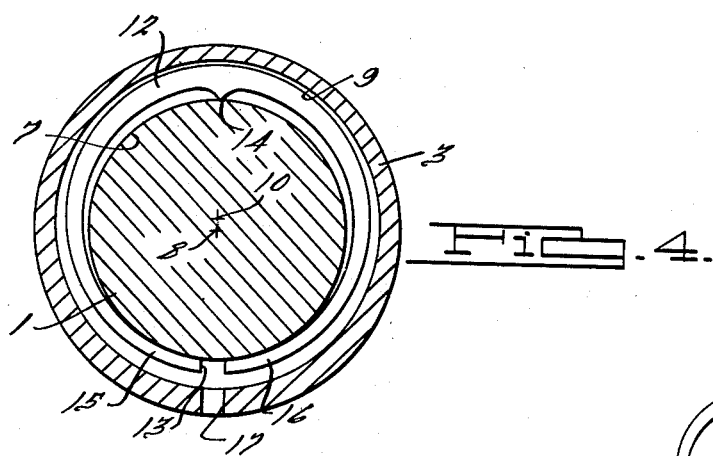
Fig. 4 is a view similar to Fig. 3 and showing the locking means in its released position.
Figure 5:
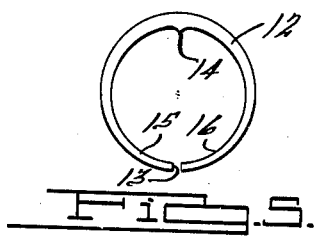
Fig. 5 is a front elevational view of the split ring eccentric member employed with the present invention.
Figure 6:
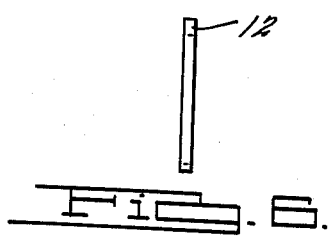
Fig. 6 is an end elevational view of the member shown in Fig. 5.

In the operation of the device above described, the member 12 is positioned within the groove 9, as shown in Fig. 4. In this position the sharp point or edge 14 substantially clears the bore 7 of the sleeve 3, and enables the shaft 1 to be passed through the bore 7, or the sleeve 3 to be slid over the shaft 1, as the case may be. The shaft and sleeve may thus be placed in proper relative position by a sliding movement within the bore 7.

The member 12 is formed of a resilient material so that the ends 15 and 16 adjacent the opening 13 provide resilient or spring-like prongs, which press against the shaft 1. The point or sharp edge 14 is held against, and caused to bite into, the shaft 1 by reason of this resilient action of the pronged ends 15 and 16.

As the shaft 1 and the sleeve member 3 are placed in proper relative position with respect to each other by the sliding action mentioned above, the point 14 of the eccentric member 12 is caused to bite into the shaft, which serves to provide an initial resistance to rotation of the wedge or eccentric member 12 with respect to the shaft 1. With the sleeve 3 and shaft in proper relative position, the bearing assembly 2, including the sleeve 3, may be locked to the shaft 1 by a simple rotation of the sleeve member 3 from the position shown in Fig. 4 to that shown in Fig. 3, or in the opposite direction. During such rotation of the sleeve 3, the wedge 12 is initially held against rotation because of the biting of the point 14 into the shaft 1. Thus, there is relative rotation between the sleeve 3 and the shaft 1, and the inner annular surface of the eccentric groove 9 bears against the outer periphery of the eccentric member 12, causing a wedge-like action which binds the sleeve 3 to the eccentric member 12 and to the shaft 1. The sleeve 3 is thus locked or bound to the shaft 1 until released by rotation in the opposite direction.

Such rotation may be readily accomplished by the provision of an opening 17 in the sleeve 3, which may be engaged by a suitable tool or wrench 18, illustrated in broken lines in Figs. 2 and 3.

It will thus be seen that, after the sleeve 3 is locked to the shaft 1, as shown in Fig. 3, the greater the effort to twist the inner ring relative to the shaft, the greater will be the pressure of the sharp edge 14 against the shaft. This wedging action automatically increases the resistance to turning between the member 12 and shaft 1, and the member 12 thus locks the sleeve 3 to the shaft 1 by virtue of its frictional and wedging engagement with the adjacent wall of the eccentric groove.

Formal changes may be made in the specific embodiment of the invention described without departing from the spirit of the invention, the scope of which is commensurate with the appended claims.

What is claimed is:

1. A device for locking a sleeve member to a shaft comprising an annular sleeve member having a portion adapted to embrace said shaft, means forming an internal, eccentric groove within said sleeve member, a split ring eccentric member having a wedge shape therearound disposed within said groove and rotatively movable with respect to said sleeve, said ring member being resilient and being positioned to have the ends thereof resiliently embrace said shaft, inwardly directed pointed means disposed between the ends and integral with said ring member and adapted to engage said shaft to prevent relative rotation between said eccentric member and said shaft, the construction and arrangement of said eccentric member within said eccentric groove being such that upon relative rotation of said sleeve member and said eccentric member said sleeve member is bound to said shaft.

2. A device for locking a sleeve member to a shaft comprising an annular sleeve member having a portion adapted to embrace said shaft, means forming an internal, eccentric groove within said sleeve member, a split ring eccentric member disposed within said groove and rotatively movable with respect to said sleeve member, said ring member being resilient and being positioned to have the ends thereof resiliently embrace said shaft with clearance between said ends and said sleeve member, an inwardly directed point formed integral with said ring member substantially midway between said ends and adapted to engage said shaft to prevent relative rotation between said eccentric member and said shaft; the construction and arrangement of said eccentric member within said eccentric groove being such that said sleeve member bears against said eccentric member adjacent said point, and upon relative rotation of said sleeve member and said eccentric member said sleeve member is bound to said shaft.

References Cited in the file of this patent

UNITED STATES PATENTS

| | | |
|---|---|---|
| 1,650,573 | Searles | Nov. 22, 1927 |
| 2,038,121 | Miller | Apr. 21, 1936 |
| 2,100,725 | Styri | Nov. 30, 1937 |
| 2,118,885 | Hughes | May 31, 1938 |